(12) United States Patent
Podoll et al.

(10) Patent No.: US 9,649,646 B1
(45) Date of Patent: May 16, 2017

(54) BROADCAST SPREADER WITH ASYMMETRIAL SWATH MANIPULATION

(75) Inventors: Michael J. Podoll, Marion, IA (US); Don S. Samuelson, Laurent, IA (US); Benjamin D. Boelter, Cedar Rapids, IA (US)

(73) Assignee: Highway Equipment Company, Cedar Rapids, IA (US)

( * ) Notice: Subject to any disclaimer, the term of this patent is extended or adjusted under 35 U.S.C. 154(b) by 640 days.

(21) Appl. No.: 13/569,861

(22) Filed: Aug. 8, 2012

Related U.S. Application Data

(60) Provisional application No. 61/548,050, filed on Oct. 17, 2011.

(51) Int. Cl.
  *B05B 7/08* (2006.01)
(52) U.S. Cl.
  CPC .................. *B05B 7/0815* (2013.01)
(58) Field of Classification Search
  CPC ... B05B 3/1021; B05B 3/1007; B05B 7/0815; A01C 3/063; A01M 7/0028
  USPC .............................................. 239/7
  See application file for complete search history.

(56) References Cited

U.S. PATENT DOCUMENTS

| | | | |
|---|---|---|---|
| 3,189,355 A * | 6/1965 | Swenson et al. | 239/657 |
| 3,618,824 A * | 11/1971 | Seymour | 222/51 |
| 6,209,808 B1 * | 4/2001 | Anderson | A01C 17/006 239/666 |
| 6,517,281 B1 * | 2/2003 | Rissi | 404/110 |
| 8,448,882 B2 * | 5/2013 | Kemmerling et al. | 239/661 |

* cited by examiner

*Primary Examiner* — Arthur O Hall
*Assistant Examiner* — Chee-Chong Lee
(74) *Attorney, Agent, or Firm* — Simmons Perris Moyer Bergman PLC

(57) ABSTRACT

A spreader with a material divider that is adjustable from side to side so as to change a percentage of a stream of material which flows through portions of the material divider and also supports and moves laterally with a spinner while the spinner is adjustable longitudinally. The geometry of spread patterns can be adjusted by laterally manipulating the location of the material divider.

10 Claims, 22 Drawing Sheets

BROADCAST SPREADER WITH ASYMMETRICAL SWATH MANIPULATION

BACKGROUND OF INVENTION

Spinner spreaders for granular, i.e. flowable material are well known in the art, for agricultural application, lawn care and road maintenance application. Typically, such spreaders are mounted onto a truck body, truck chassis, trailer, or slid into a truck's dump body. The spreader includes a material storage bin(s), a conveyor system(s), metering method, and rotating spinners. The conveyor systems transfer material from the storage bin(s) to the spinners. The spinners broadcast the material across the field, lawn, or road. Usually a single spinner or a pair of laterally spaced spinners are provided with a material divider plate positioned above the spinners to direct the material from the discharge end of the conveying means onto the spinners.

Many factors influence the spreading of granular materials and uniform distribution of the particles. They include the size, shape, hardness, density, and volumetric flow rate of the material particles. The diameter of the spinner disk or fan, the speed of the spinner disk, the radial angle of the fins, the loft angle, friction factors also among others that influence the spreading of material. As taught in U.S. Pat. No. 6,517,281 to Rissi, many of these factors can be accounted for by adjusting the drop point of material onto the spinning disks. This patent is hereby incorporated herein in its entirety by this reference.

Spreader manufacturers are constantly trying to improve the value of their spreaders by increasing the amount of acres spread per hour. The vehicles carrying or towing the spreader are operating at a higher speed to cover more acres per day. More importantly, the manufacturers are developing spreaders capable of uniform symmetrical distribution over a wider swath width. Wider patterns result in less use of expensive fuel, less soil compaction, and less time spent spreading each acre. The result is a significantly higher return on investment for those using this equipment. These types of spreaders are typically broadcast spreaders with two spinner disks.

Global positioning systems (GPS) and automatic steering systems are able to guide the vehicles accurately through field and help maintain uniform coverage of materials. However, in order to cover the field area completely, the wider spread patterns of a broadcast spreader make it difficult to avoid overlapping areas or spreading into areas that should be avoided. Likewise, spreading on irregular shaped fields may result in inadequate coverage when the spreading vehicle is approaching areas at an angle that is not perpendicular to areas already covered. The difference in an overlapping area to an area without coverage will show significantly as plants are growing. In most cases, the applicator makes sure that all areas are covered rather than skipping small areas that are inefficient to cover. This results in using more fertilizer and higher costs.

To some extent, the width of a symmetrical pattern with regard to the center line of the carrying or towing vehicle can be reduced by simply decreasing the amount of metered material conveyed to the spinner in proportion to the reduced width in combination with reducing the spinner rpm to throw the particles less distance. High throughput spreaders producing wide flat top patterns produce results with some compromise to a uniform spread distribution unless the drop point of material onto the spinner disks can be adjusted as taught in the '281 Rissi patent. European spreaders typically producing a pyramid spread pattern can likewise reduce the material flow and the spinner speed to result in a lesser width.

Spreaders producing wide flat top patterns have the most abrupt decline of the spread pattern at the outside edges of the distribution. Because of this abrupt fall off of the pattern, flat top patterns require the least amount of edge overlap to produce a uniform distribution. At the same time, too much overlap of these spreaders quickly produce areas that can double the intended rate per area. Spreaders producing pyramid patterns have a generally declining distribution from the centerline to the outside edges and require an overlap equal to half of the total width. Pyramid pattern spreader overlap errors have a more gradual effect.

When spreading the outside perimeter of a field, flat top patterns also have a distinct advantage over the pyramid pattern because of the more abrupt cutoff. To aid spreading around the perimeter of the field, pyramid pattern spreaders usually use a combination of mechanical deflectors, reduced spinner speed, and reduced flow to produce an acceptable reduced width boundary condition at one side of the centerline of the carrying or towing vehicle.

Many of the pyramid pattern spreaders utilizing two spinner disks are gravity fed. These spreaders rely on accurate placement of fertilizer on to the spinner disk through an orifice directly above each spinner. The throughput of these spreaders are limited by how fast the material can gravity flow from a funnel shaped bin through the restrictive orifice and on to the spinner. While they can produce a wide pyramid pattern and the flow can be adjusted easily, the orifice limits the speed of the carrying or towing vehicle and overall throughput.

Many of the flat top pattern spinner spreaders rely on accurate placement of fertilizer across a larger radial portion of the fins on the spinner disk. As in the '281 patent, this accurate placement is accomplished by positioning the spinners under a fixed drop edge. Material conveyed from a bin can fall onto the guiding drop edge without being restricted by a gravity fed orifice at the bottom of a bin. These spreaders can produce a wide flat top pattern with the conveying system capable of high flow rates and high overall throughput.

The twin spinner gravity fed spreaders have an advantage of varying the flow rate to each spinner by adjusting individual orifices. If an asymmetrical pattern is desired for a field boundary condition, an angled headland, an irregular field profile, or a narrowed swath, the orifice is reduced and the spinner speed is lowered to maintain the distribution rate for the narrower side of the spread pattern. To accomplish the same in a twin spinner conveyor fed spreader, some manufacturers have tried to position a split gate upstream from the conveyor end. Another way of reducing the flow to one spinner is to provide twin conveyors capable of varying the amount of flow to each spinner. Doing so requires independent control of each conveyor.

It is common for present day spinner spreaders to have multiple product bins with conveying or metering systems for each bin. This allows the user to spread multiple fertilizer or seeding products in one pass down the field while constantly varying the outputs to match the needs or capabilities of the soil, thus producing the highest yield for the least amount of input costs and gives the farmer a higher return on investment.

As taught in the U.S. Pat. No. 6,817,551 to Williams et al, having the conveyors of each bin meter directly into a common material gravity flow column allows multiple products to be mixed without any other delay in transport. For common thinking, combining multiple bins of a conveyor fed twin spinner spreader with the need to meter the product independently to each spinner would require a split conveyor for each bin. While electronics and software can easily control doubling the number of conveyor systems, the doubling of hydraulic motors, hydraulic valves, sensors, conveyors, bearings, drive shafts, etc. are expensive, add weight to the spreader, add volume to the drive components and take away usable volume for the spreader bins, hurt hydraulic efficiencies, etc. The increase in mechanical and hydraulic parts increase repair items and the dense packaging of those components would make access to the repair items more difficult.

Another way of solving the problem is to have independent upstream orifice control, commonly accomplished and referred to as a feed gate, which could meter material independently from each bin unto conveyors feeding each spinner. This also creates a doubling of mechanisms and requires movement of the gate to meter the correct amount of product. Having the orifice upstream creates the need to "look ahead" for the controls to anticipate changes in the swath width and there is the need to determine master and slave relationships between the conveyors and gates as metering is accomplished by both speed and opening.

The increased swath widths and the limitations of conventional dual spinner prior art create the need for a simple method of metering product flow from each spinner spreader conveyor bin to produce asymmetrical flow to each spinner to match asymmetrical spreading conditions required for various field boundary conditions.

Furthermore, there is also a need to create a simple method to place product onto the spinner disk in a manner to permit spreading to one side of the spreading vehicle allowing the product to be spread into a field from a road, tramline, or as the spreader is approaching a headland at a non-perpendicular angle.

The need for a simple method to do the above also needs to be accomplished with minimum compromise to the spread pattern coefficient of variation or restriction to the material flow.

SUMMARY OF THE INVENTION

Accordingly, a primary objective of the present invention is an improved particulate material spreader with a provision that achieves proper placement of product onto a field, lawn or other area in both symmetrical and asymmetrical patterns with relationship to the line of travel.

Another objective of the present invention is to divide the flow of product being delivered to twin spinners from a shared conveyor in the same ratio as the asymmetry of the required spread pattern.

Another objective of the present invention is to divide the flow of product being delivered to twin spinners from shared conveyors of multiple bin spreaders in the same ratio as the asymmetry of the required spread pattern.

Another objective of the present invention is to divide the flow of product being delivered to twin spinners by moving a divider, fixed in location with respect to the spinner disks, transversely beneath the flow of material leaving a conveyor system.

Another objective of the present invention is to divide the flow of product being delivered to twin spinners by moving a divider, fixed in location with respect to the spinner disks, transversely beneath the flow of material leaving a conveyor system whereas the product flow is placed on the spinner disk at a point that aids proper placement onto the field, lawn, or other area.

Another objective of the present invention is to combine the benefits of dividing the flow into necessary ratios via the transverse divider movement with independent fore and aft movement of the spinner under the same divider to achieve proper placement of material onto a field, lawn, or other area.

Another objective of the present invention is to is to divide the flow of product being delivered to twin spinners by moving a divider, fixed in location with respect to the spinner disks, transversely beneath the flow of material leaving a conveyor system whereas the product flow is placed on the spinner disk at a point that aids proper placement onto the field while spreading field boundaries.

The adjustable spinner of the present invention is adapted for use with a spreader for broadcasting particulate material onto a field, lawn, or other area. The spinner includes a frame which is adapted to be adjustably mounted transversely beneath a conveyor discharge. Fixed to the transversely adjustable frame is a material divider above a pair of rotating spinner disks whereas the transverse adjustment of the frame moves both the divider and disks causing a split of material flow in any number of variable ratios to each spinner disk in a ratio necessary to facilitate variable asymmetric spread patterns. The position of the divider and spinners relative to the conveyor discharge can be controlled, either manually or automatically, with or without automatic position feedback, by any number of means such as mechanical, electrical, pneumatic, or hydraulic so as to adjust the ratio and placement of material onto the spinners to accomplish any number of symmetrical or asymmetrical patterns. The position of the divider and spinners can be further aided by varied spinner rotational speeds, independent of each other, to further aid definition of spread pattern shape and position.

The present invention comprises:

A container containing flowable matter;

A carriage, which is movably coupled to the container;

A material divider which is movable with the carriage;

A spinner disk coupled to the carriage;

Means for simultaneously moving the carriage, in a first direction, which is at an angle with respect to flowable matter falling onto the material divider.

BRIEF DESCRIPTION OF DRAWINGS

FIG. 1 is an overview of truck mounted spreader with material storage box, conveyor, divider, and spinner spreader, of the prior art.

FIG. 2 is an overview of truck mounted spreader with multi-compartment storage box, a plurality of conveying means, divider, and spinner spreader, of the prior art.

FIG. 3 is an overview of angled headland showing variable spread widths and a spreader.

FIG. 4 is a simplified top view of spinner, divider, conveyor discharge for symmetrical spreading, of the present invention.

FIG. 5 is a spread pattern symmetry associated with the division of material in FIG. 4.

FIG. 6 is a simplified top view of spinner, divider, and conveyor discharge for a spinner offset to divide the material flow in a ratio of 2 to 1.

FIG. 7 is a spread pattern symmetry associated with the division of material in FIG. 6.

DETAILED DESCRIPTION

Figure 1:
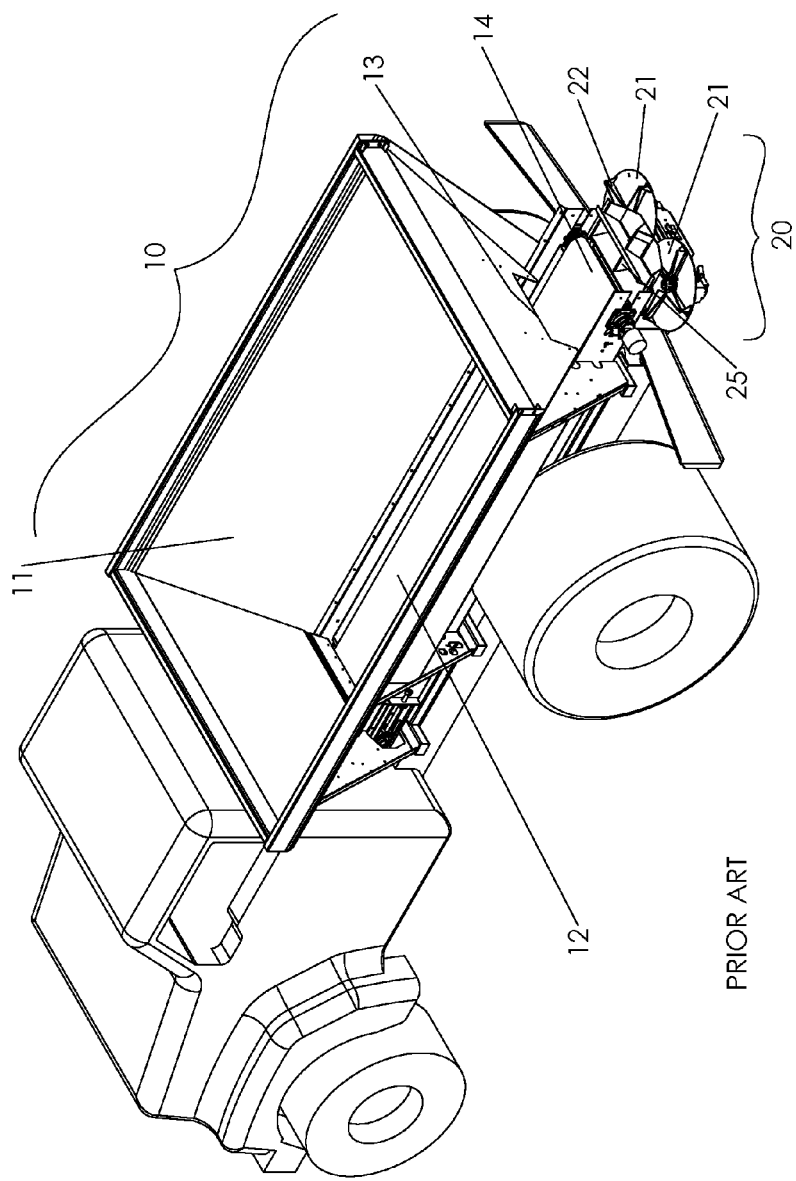

Now referring to the drawings, wherein like numerals refer to like matter throughout and more particularly referring now to FIG. 1, which is a perspective view of a typical prior art truck mounted spreader 10 comprising a single v-body hopper 11, an endless conveyor 12 capable of transporting particulate material from the hopper 11 through an adjustable opening or feed gate 13 to the conveyor discharge end 14. Note: while an endless conveyor belt is shown, slat conveyors, chain conveyors, augers or any suitable means of conveying the flowable matter could be used. Mounted under the conveyor discharge end 14 is a spinner spreader generally designated 20. The spinner spreader 20 comprises two rotatable spinner disks 21 with blades 22 that can accept metered material flowing from the conveyor discharge end 14 and distribute the particulate material onto a field, lawn, or road. Any number of spinner disks more than one, could be used in the present invention, two is merely an exemplary embodiment. (For example, more could be used if subflow dividers were used for the main flow and spinners were deployed at multiple levels). Between the spinner spreader 20 and conveyor discharge end 14 is a material divider 25 that separates the material being discharged into columns of equal measure for placement onto the spinner disks 21. Note: the material divider 25 can have an open end or can have a rear panel limiting the size of the flow. This material divider 25 may be adjustable fore and aft to direct placement onto the spinner disks 21 in a manner that affects when the particulate material leaves the disk blades 22 and therefore, the placement of the particulate material on the area being covered. As taught in Rissi patent '281, the material divider 25 may also be fixed and the spinner spreader 20 itself moveable fore and aft to further affect the precise placement of material on the area being covered.

Figure 2:
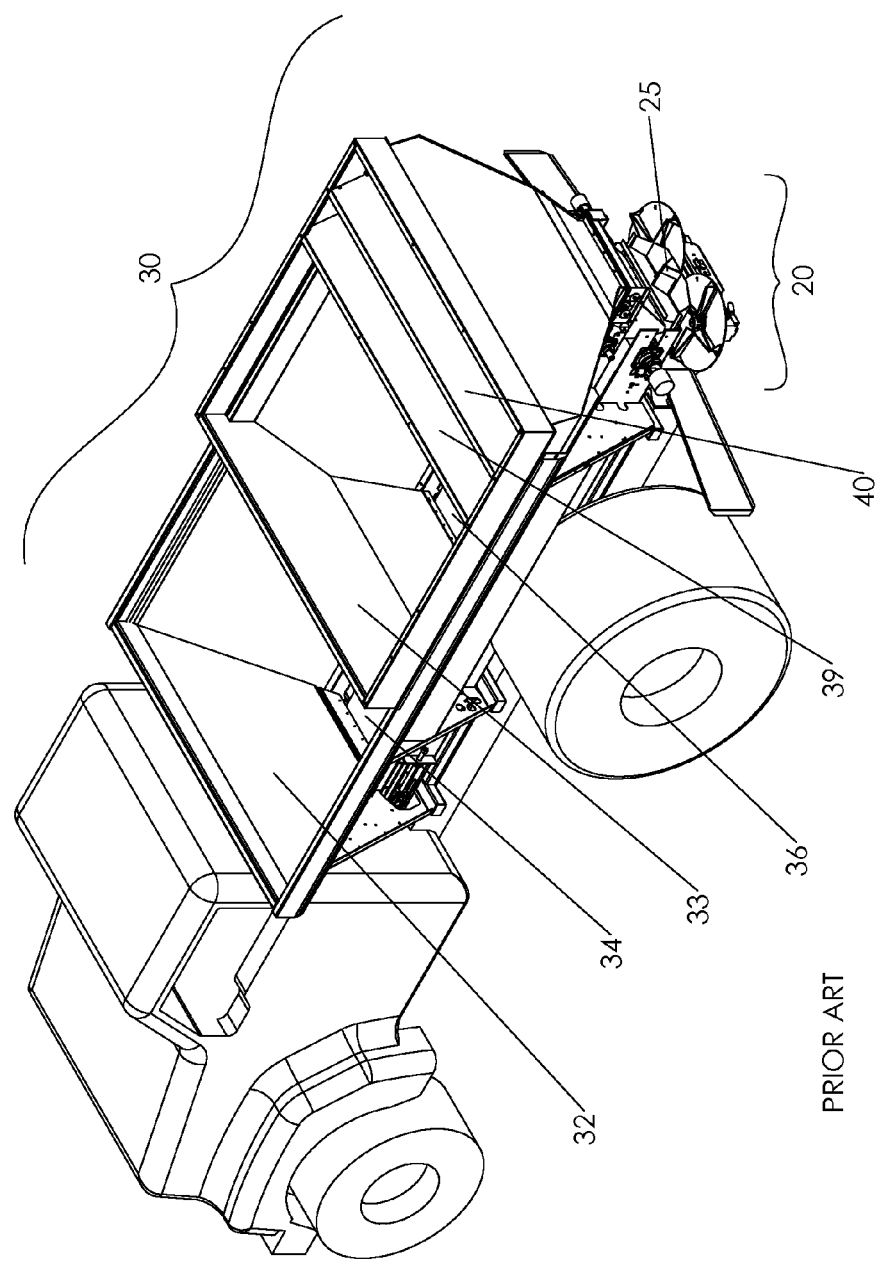
Figure 21:
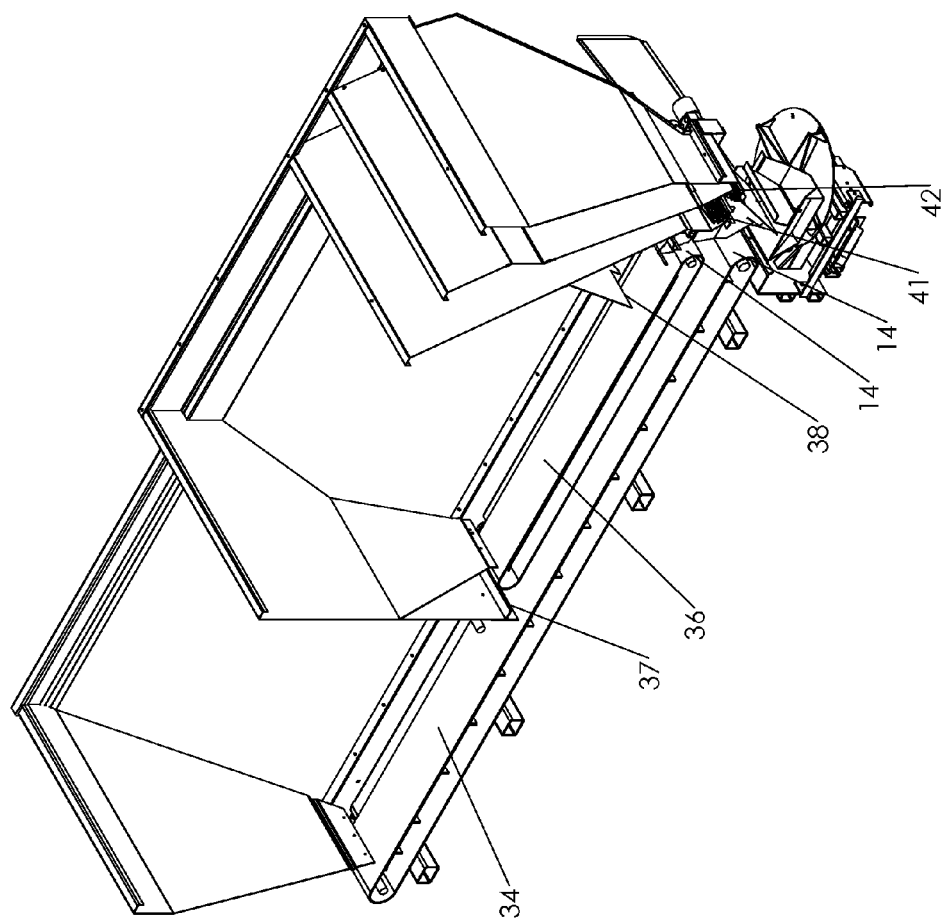
FIG. 21 is a sectioned view of FIG. 2 showing detail of conveyors, metering cylinders, and adjustable openings.

Now referring to FIG. 2 and FIG. 21, there is shown another perspective view of a typical prior art truck mounted multi-compartment spreader 30 comprising multiple material hoppers 32, 33, 39, and 40 with independent conveying means capable of transporting particulate material from each hopper to a discharge end. In the example shown, hoppers 32 and hopper 33 utilize endless conveyors 34 and 36 and adjustable openings 37 and 38 similar to the example in FIG. 1 to transport and meter material to the conveyor discharge end 14. Hoppers 39 and 40 are mounted above, and gravity feed particulate material to, metering cylinders 41 and 42. These metering cylinders 41 and 42 and conveyor discharge ends 14 of the endless conveyors 34 and 36 all discharge material into the same vertical space where the materials fall nearly unrestricted by gravity on to a spinner spreader 20 as described earlier for the single hopper spreader 10. Therefore, any change in the endless conveyors 34 and 36 or meter cylinders 41 and 42 revolutions per time will immediately and independently affect the volume of material discharging from each hopper. Between the spinner spreader 20 and the conveyor discharge ends 14 and metering cylinders 41 and 42 is a material divider 25 that separates the material being discharged into columns of equal measure as described earlier for the single hopper spreader 10. Likewise, this divider 25 is typically either adjustable fore and aft or fixed as described for the single hopper spreader 10.

For simplicity, the remainder of the detailed description will use references for a typical truck mounted spreader 10 comprising a single v-body hopper 11. It shall remain understood that the present invention can be employed by spreaders with any number of material hoppers.

Figure 3:
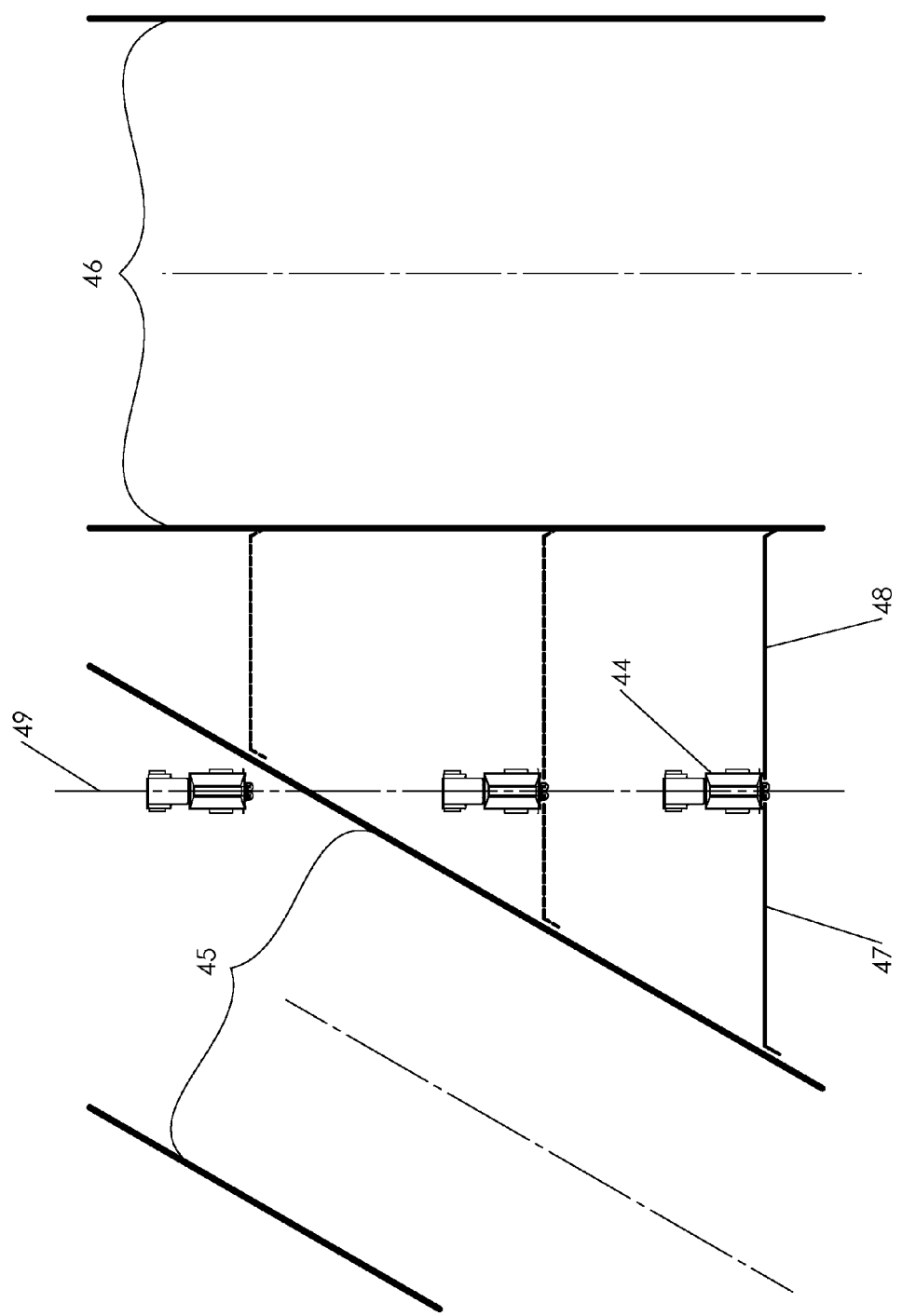

Now referring to FIG. 3, there is shown a somewhat diagrammatic bird's eye view of a condition encountered by spreaders in an agricultural setting where the field is in an irregular shape. The angled headland 45 is being approached by a truck mounted spreader 44, running parallel to the previous swath 46 that was spread. As the truck mounted spreader 44 enters the acute angle formed by the headland 45 and parallel swath 46, the need is to reduce the left hand spreading distance 47 from 100% to 0% from the centerline of travel 49 of the truck mounted spreader 44. Also, as the truck mounted spreader 44 enters the headland area 45, the right hand spread width 48 remains at 100% but with the desired material being spread further and further from the centerline of travel 49. The condition described and shown is also encountered as spreaders traverse through grassy waterways or spread around potholes and similar objects creating irregular boundaries.

One should note that as the desired total width of the swath formed by the right hand spreading distance 48 plus the left hand spreading distance 47 is decreased, there is a corresponding need to decrease the speed of the conveyor 12 or flow through a metering device such as the adjustable opening 13 to maintain the desired rate per acre.

Figure 4:
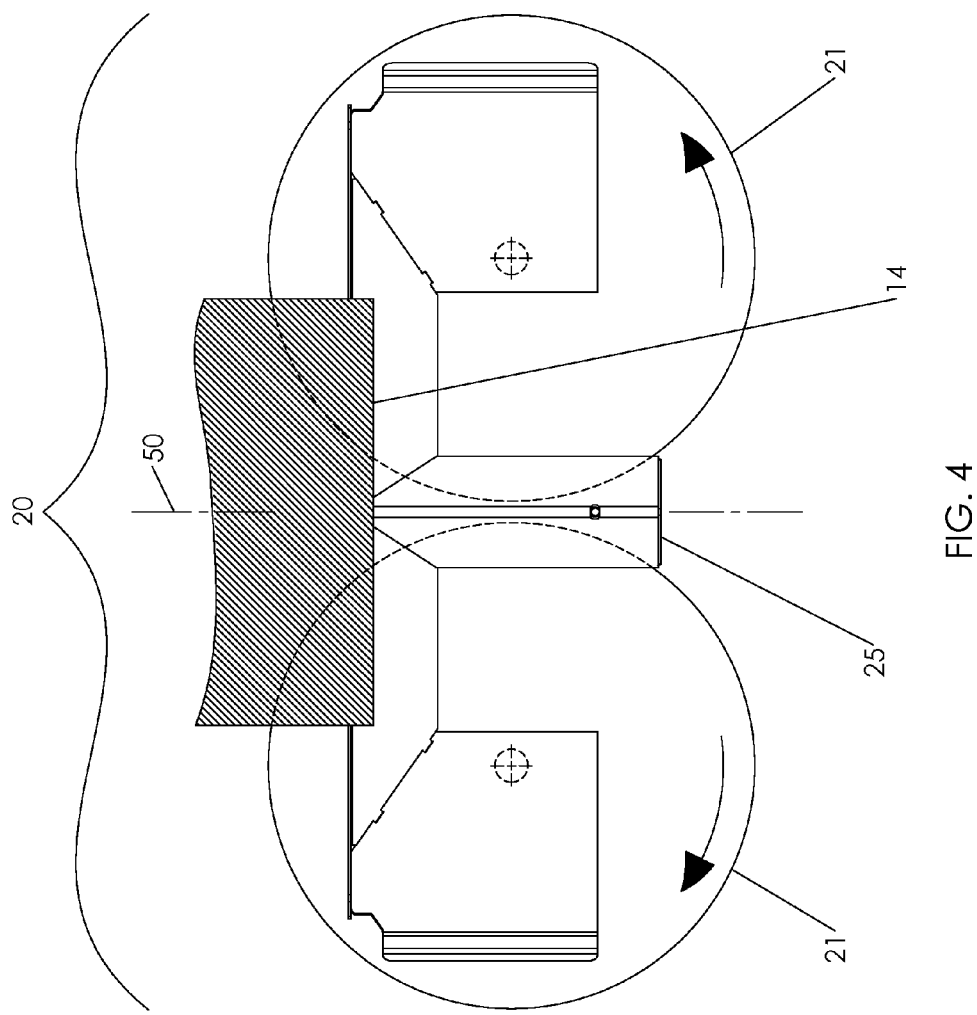

Now referring to FIG. 4, there is shown a simplified bird's eye view of the spinner spreader 20 with material divider 25, rotatable disks 21, and conveyor discharge end 14 in position for symmetrical spreading that is of similar geometry to that of the prior art. In this case, the conveyor discharge end 14 is directly placed over a referenced centerline 50, typically that of the spreader vehicle centerline of travel 49. The material divider 25 is also centered to the referenced centerline 50 and therefore will divide material coming from the conveyor discharge end 14 of one or more conveyors into equal amounts onto each spinner disk 21. With volume and placement of the particulate material is divided equally and for each spinner disk 21 turning at the same revolutions per minute, the resulting distribution onto the field, lawn, or roadway will be symmetrical from the referenced centerline 50.

Figure 5:
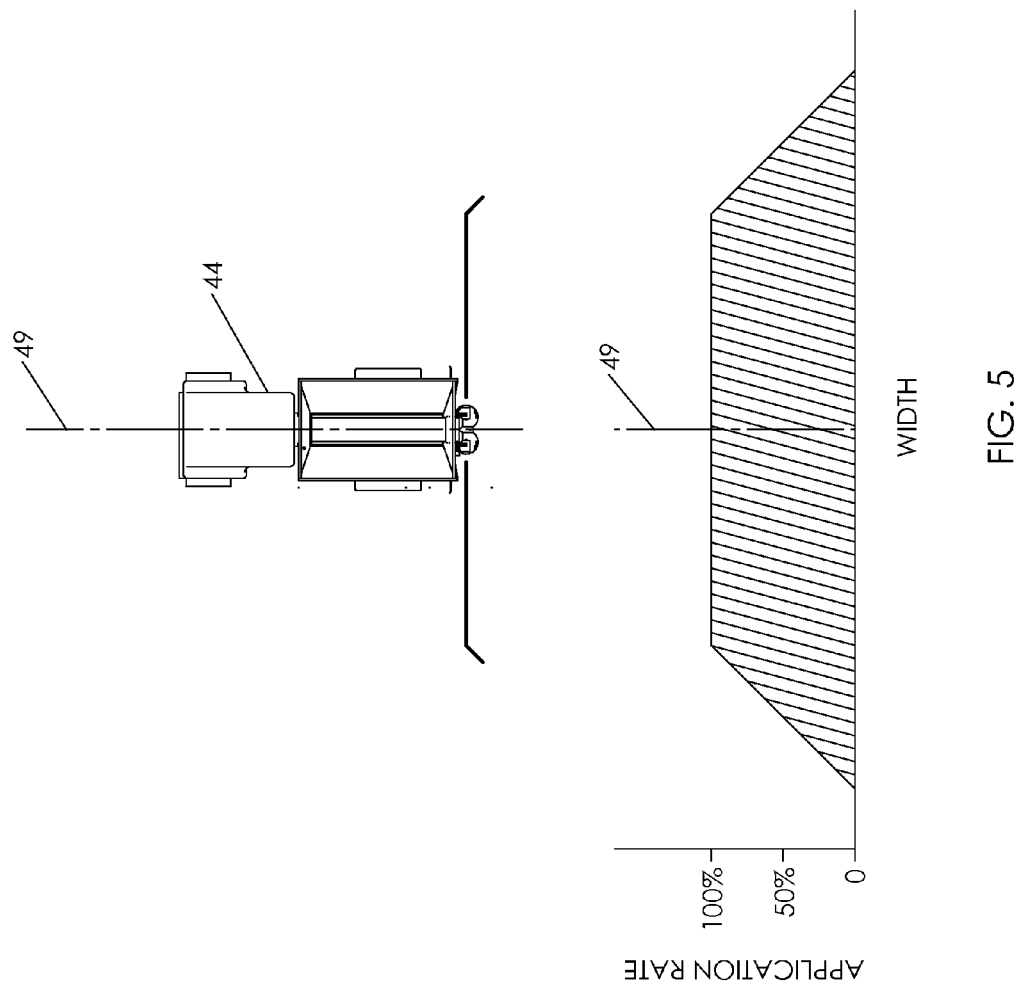

Now referring to FIG. 5, there is shown a simplified representation of the resulting spread pattern of a spinner apparatus with the relationship between conveyor discharge end 14, divider 25, and spinner disks 21 as shown in FIG. 4 if tested to a known standard such as ASABE S341.4.

Figure 6:
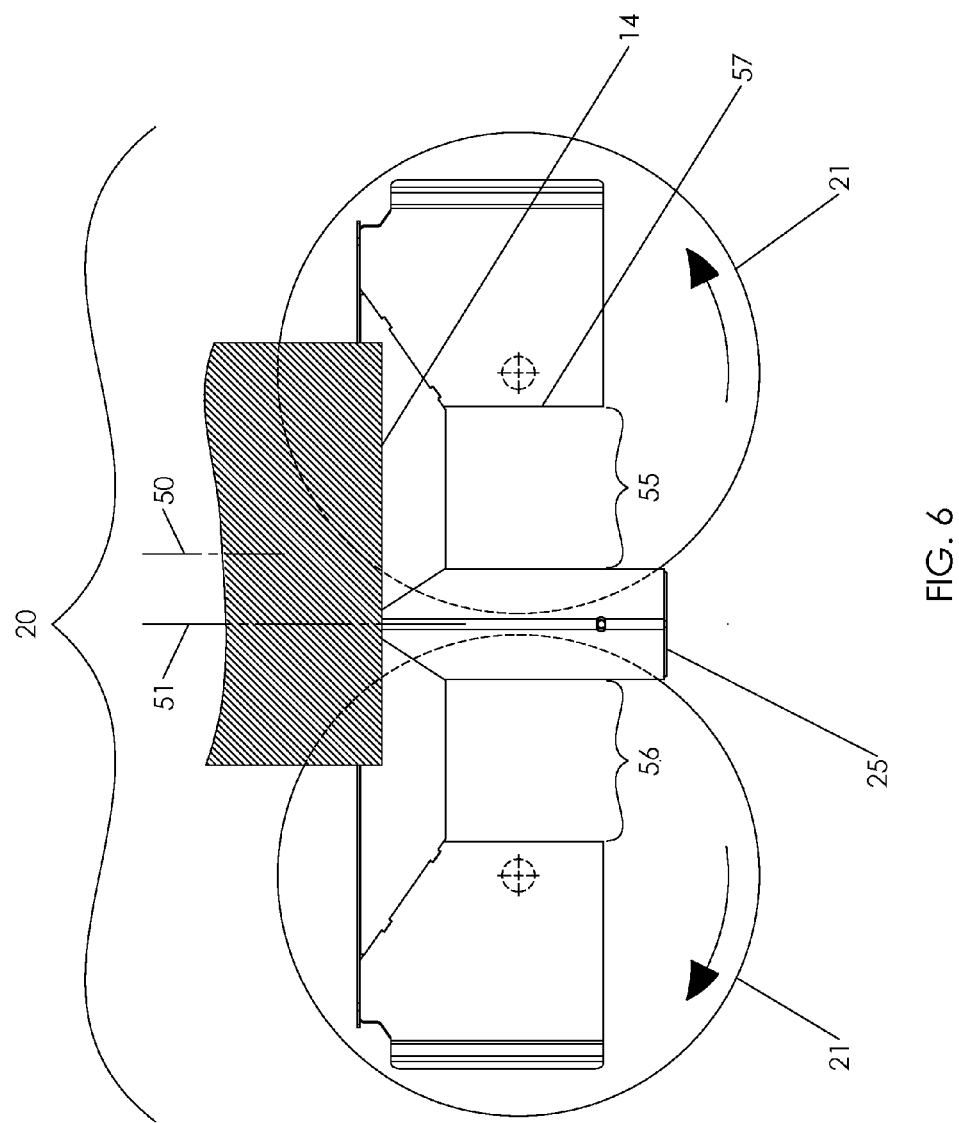

Now referring to FIG. 6, there is shown a simplified bird's eye view of the present invention including a spinner spreader 20 with material divider 25, rotatable disks 21, and conveyor discharge end 14 in position for asymmetrical spreading. In this case, the conveyor discharge end 14 is directly placed over a referenced centerline 50, typically that of the spreader vehicle centerline of travel 49. The spinner spreader centerline 51 with material divider 25, and spinner disks 21, is offset from the referenced centerline 50 to divide the material flow to ⅔ to the right hand material divider opening 55 and ⅓ to the left hand material divider opening 56 and spread 75% of the original total width or 100% of the original right hand width 48 and 50% of the original left hand width 47. Note: the offset of the material divider 25 is accomplished by a mechanism (not shown) which can move it from side to side. With a corresponding change to 75% of the original conveyor revolutions per minute, the volume of divided material passing through the right hand material divider opening 55 and onto the spinner remains equal to that of the symmetrical pattern described and shown in FIG. 4 & FIG. 5. Likewise, the volume of divided material falling to the left hand material divider opening 56 is reduced to 50% (33% of width multiplied by 75% of the conveyor discharge rate) of the original volume to correspond to the desired reduced left hand width 47.

Figure 7:
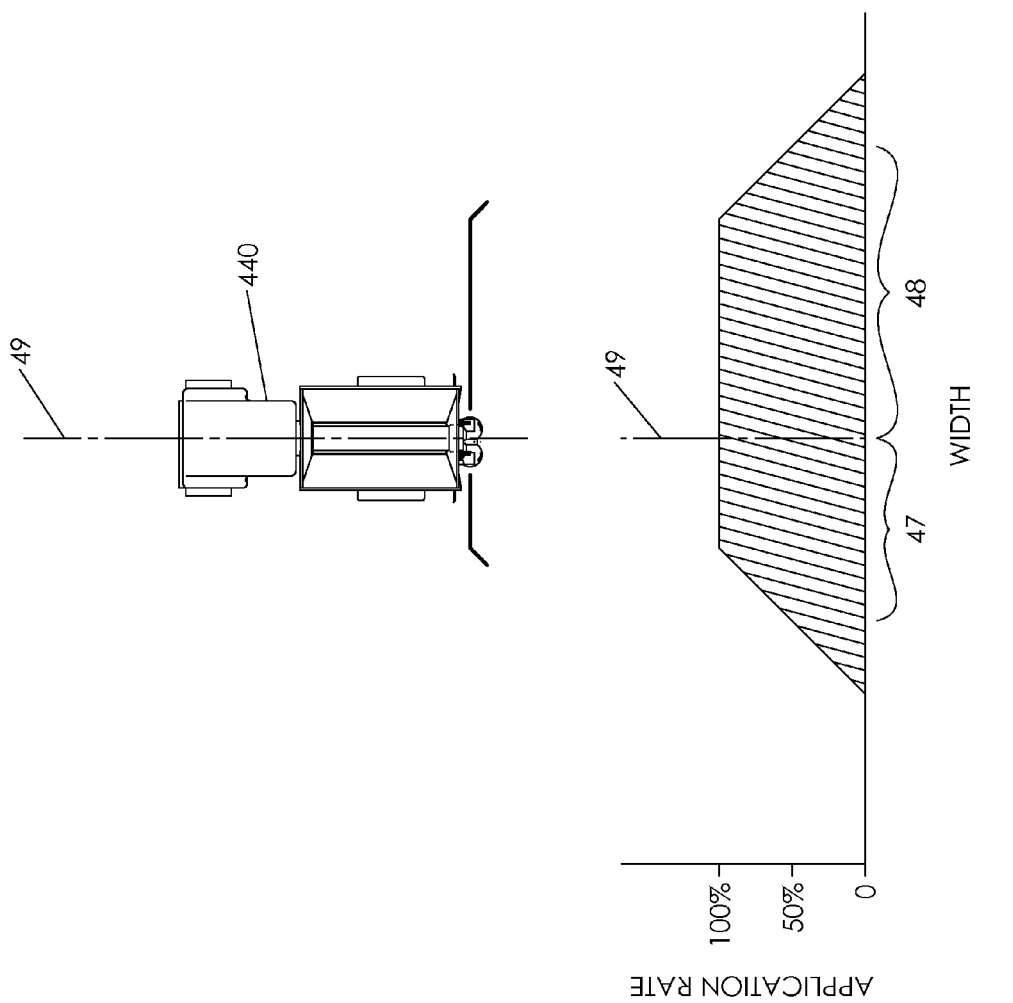

Now referring to FIG. 7, there is shown a simplified representation of the resulting spread pattern of a truck mounted spreader 440, of the present invention, with a spinner apparatus with the relationship between conveyor discharge end 14, divider 25, and spinner disks 21 as shown in FIG. 6, if tested to a known standard such as ASABE S341.4.

Figure 8:
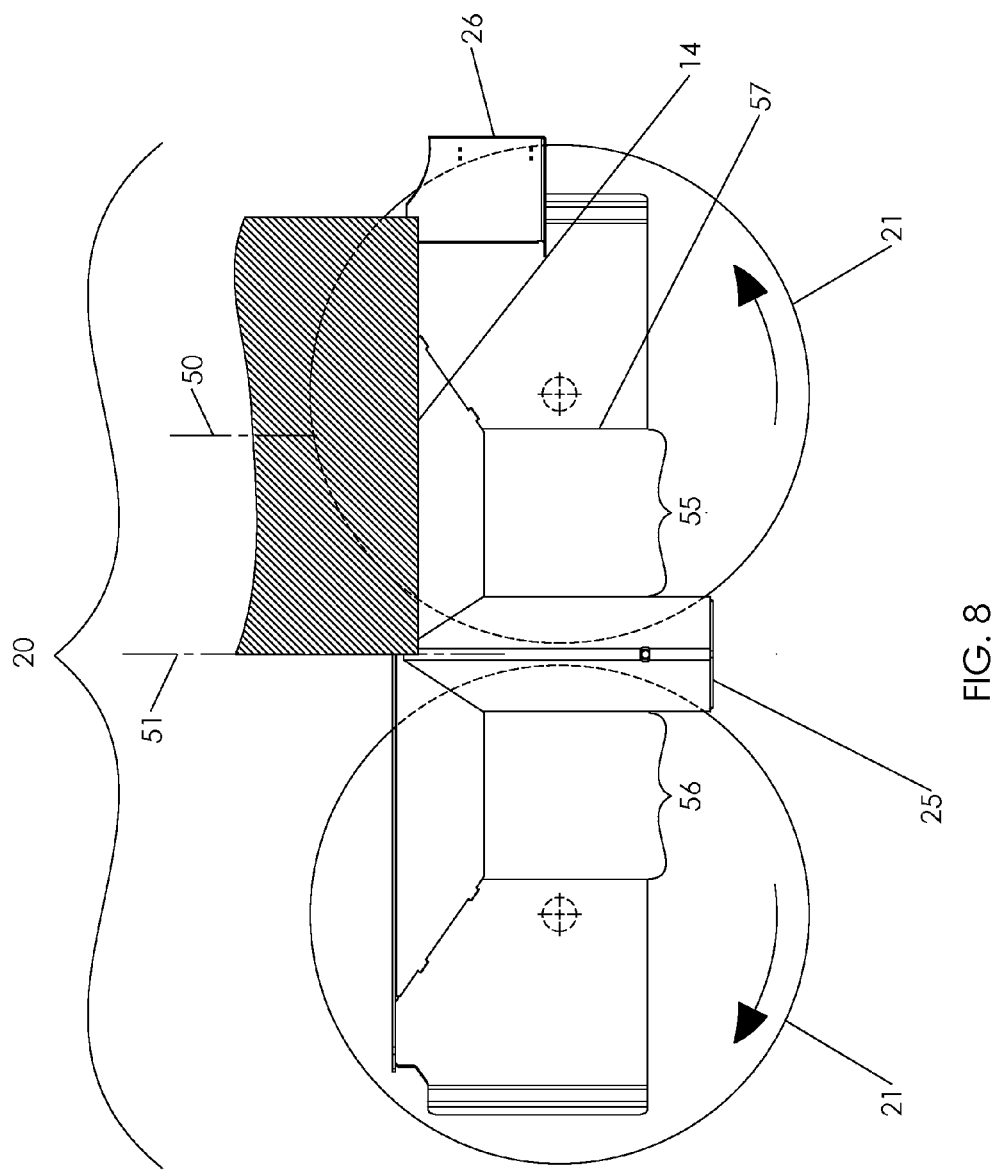
FIG. 8 is a simplified top view of spinner, divider, and conveyor discharge for a spinner offset to place all material onto one spinner disk.

FIG. 8 is a simplified view of a portion of truck mounted spreader 440 with spinner 20, divider 25, side deflector 26, and conveyor discharge end 14 for asymmetrical spreading. In this case, the conveyor discharge end 14 is directly placed over a referenced centerline 50, typically that of the spreader vehicle centerline of travel 49. The material divider 25, along with the spinner disks 21, is offset to divide the material flow 100% to the right hand material divider opening 55 and 0% to the left hand material divider opening 56 and spread 50% of the original total width or 100% of the original right hand width 48 and 0% of the original left hand width 47. With a corresponding change to 50% of the original conveyor revolutions per minute, the volume of material passing through the right hand material divider opening 55 and onto the spinner remains equal to that of the symmetrical pattern described and shown in FIG. 4 & FIG. 5. Likewise, the volume of material falling to the left hand material divider opening 56 is reduced to 0% of the original volume to correspond to the desired left hand width 47.

Figure 9:
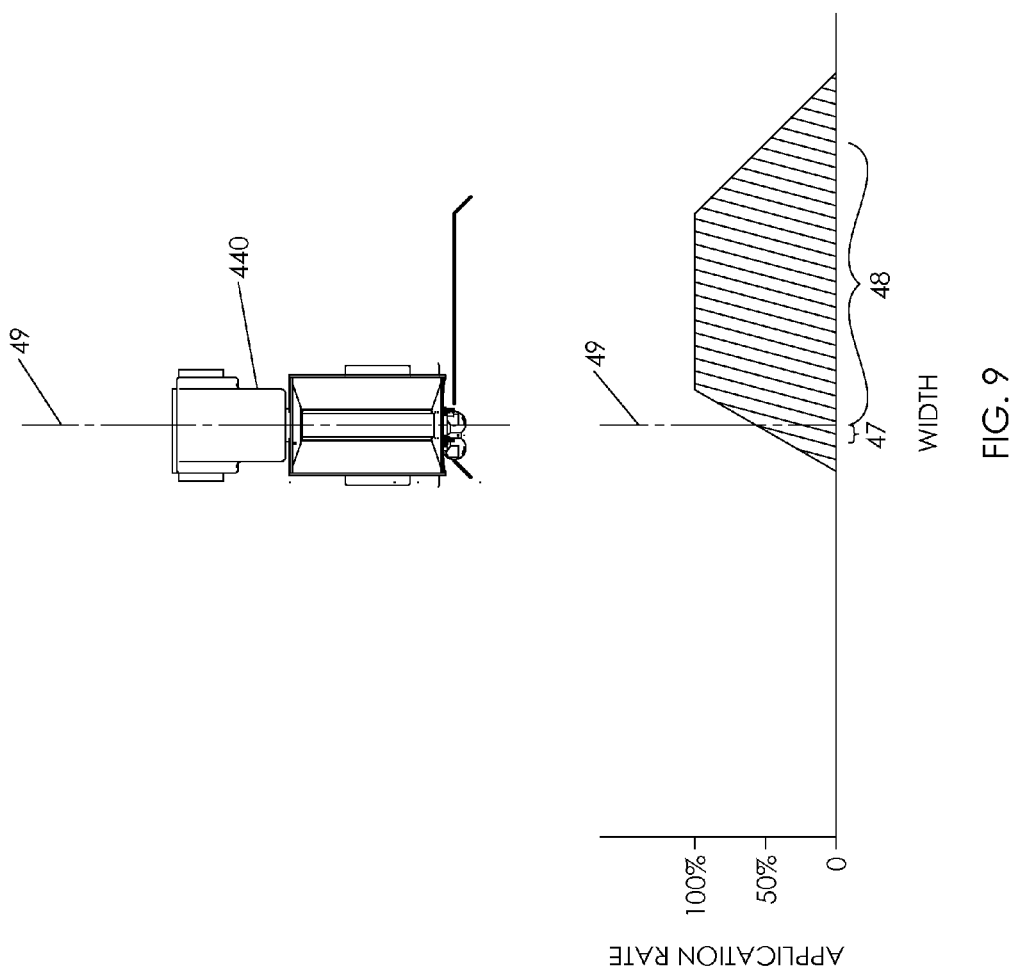
FIG. 9 is a spread pattern symmetry associated with the division of material in FIG. 8.

FIG. 9 is a simplified representation of the resulting spread pattern of truck mounted spreader 440 with a spinner apparatus with the relationship between conveyor discharge end 14, divider 25, and spinner disks 21 as shown in FIG. 8, if tested to a known standard such as ASABE S341.4.

Figure 10:
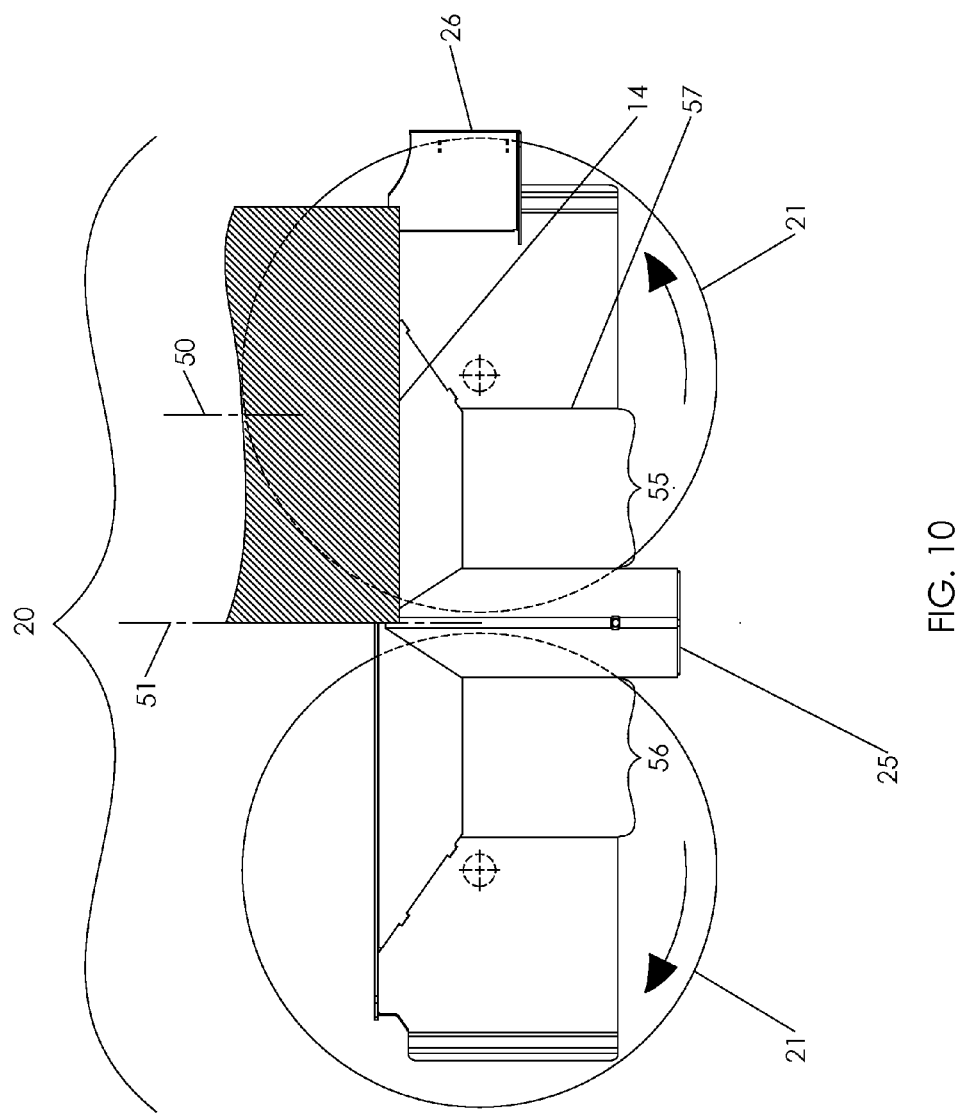
FIG. 10 is a simplified top view of spinner, divider, and conveyor discharge for a spinner offset to place all material onto one spinner disk with divider placed to drop material later in the rotation of the disk than FIG. 8.

Now referring to FIG. 10, when the truck mounted spreader 440 with a material divider center of symmetry 51 which is offset from the conveyor centerline 50 as shown in FIGS. 6 and 8, a simple deflector 26 is used to keep material funneled into the material divider 25. Because the material divider opening 55 is offset from the original column of material coming from the conveyor discharge end 14, this also creates a heavier flow near the right hand edge 57 of the right hand material divider opening 55 as shown in FIGS. 6 and 8. This material is placed closer to the inside of the corresponding disk 21 rotating in the direction shown, requires more rotation before it leaves the disk 21, and is therefore thrown further away from the referenced centerline 50 at a distance defined by material shape, size, density, and by the rotational speed of the spinner disk itself.

Likewise, the hinged deflector 26 hangs vertically and keeps the reduced column to the left hand material divider opening 56 concentrated to the right hand edge of the left hand material divider opening 56. The natural effect of shifting the material divider 25 therefore places most of the material to the outside of the left hand spinner disk 21 where it interacts with the blades 22 on the disk 21 rotating in the direction shown and is distributed after a small amount of disk rotation. The landing point of this particulate material is therefore directly behind the spreader without large dependence on material shape, size, density, or by the rotational speed of the spinner disk itself.

Figure 11:
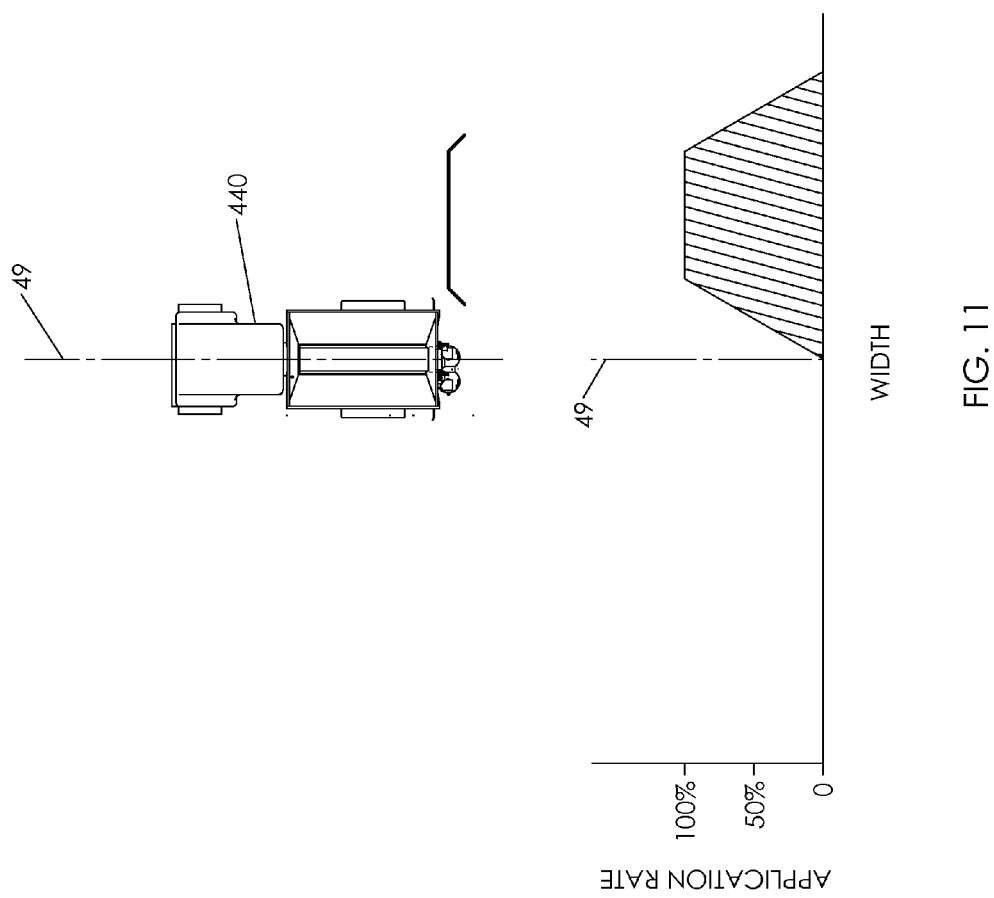
FIG. 11 is a spread pattern symmetry associated with the division of material in FIG. 10.

By utilizing a fixed divider 25 and longitudinally movable spinner frame as described in the Rissi '281 patent, the shape and distribution of the particulate material can be further influenced to meet the needs of various asymmetrical conditions. In FIG. 10, the divider 25 and spinner disks 21 are shifted completely to one side and the longitudinally movable spinner frame is moved further under the conveyor discharge end 14 which places material on the spinner disk 21 and blades 22 later in rotation. The resulting simplified representation of the spread pattern in FIG. 11 shows that the spread pattern onto the field can be shifted completely to the side of the centerline of travel 49 with correct fore and aft and side to side positioning of the spinner disks 21.

In the preferred embodiment of the invention a spinner spreader generally designated 20 is mounted below a conveyor discharge end 14 of one or more conveying and metering means. As noted earlier and for the simplicity of describing the present invention, the remainder of the detailed description will use references, unless otherwise noted, for a typical truck mounted spreader 10 comprising a single v-body hopper 11. It shall remain understood that the present invention can be employed by spreaders with any number of material hoppers.

Typically the material transported by the endless conveyor 12 passes through an adjustable opening 13. The conveyor(s), and metering cylinders of a multi-compartment spreader, are fixed longitudinally and vertically centered with respect to each other to discharge a stream of particulate material onto the spinner disks 21 of the spinner spreader 20.

Figure 12:
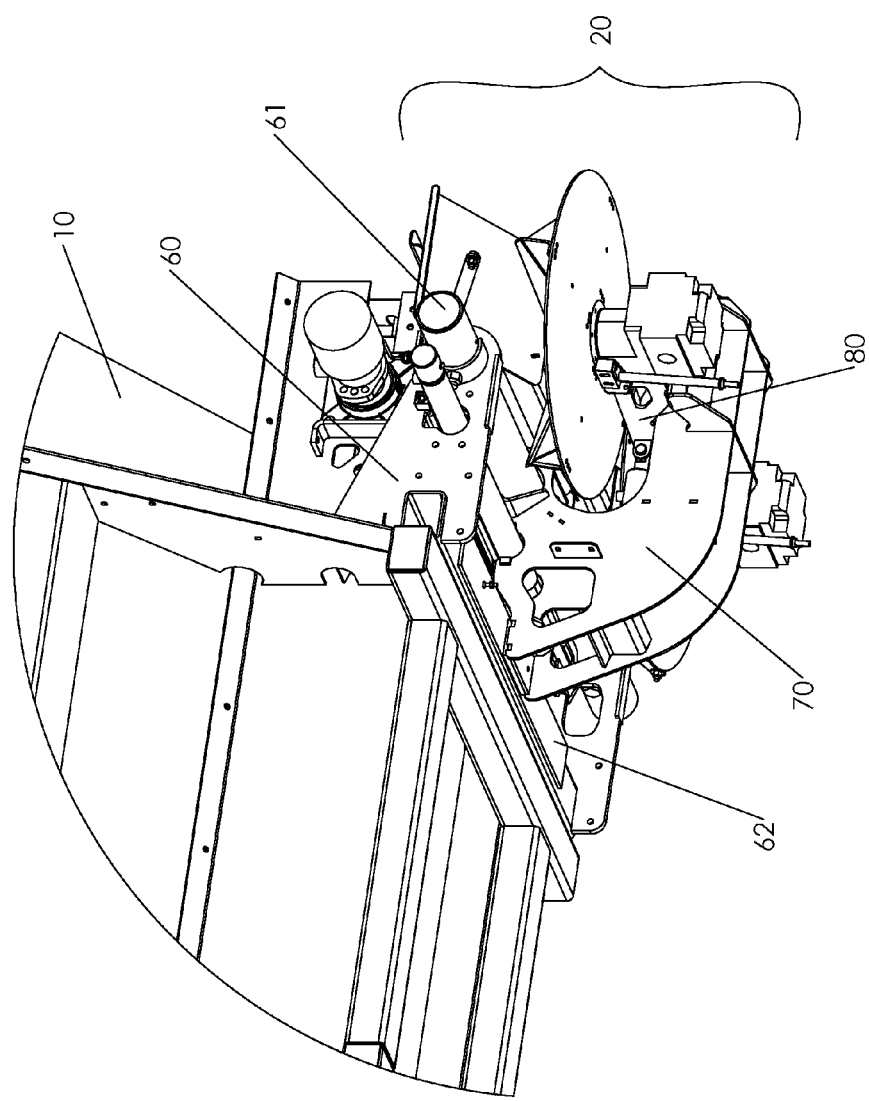
FIG. 12 is a perspective view of underside of present invention noting basic frame structures.
Figure 13:
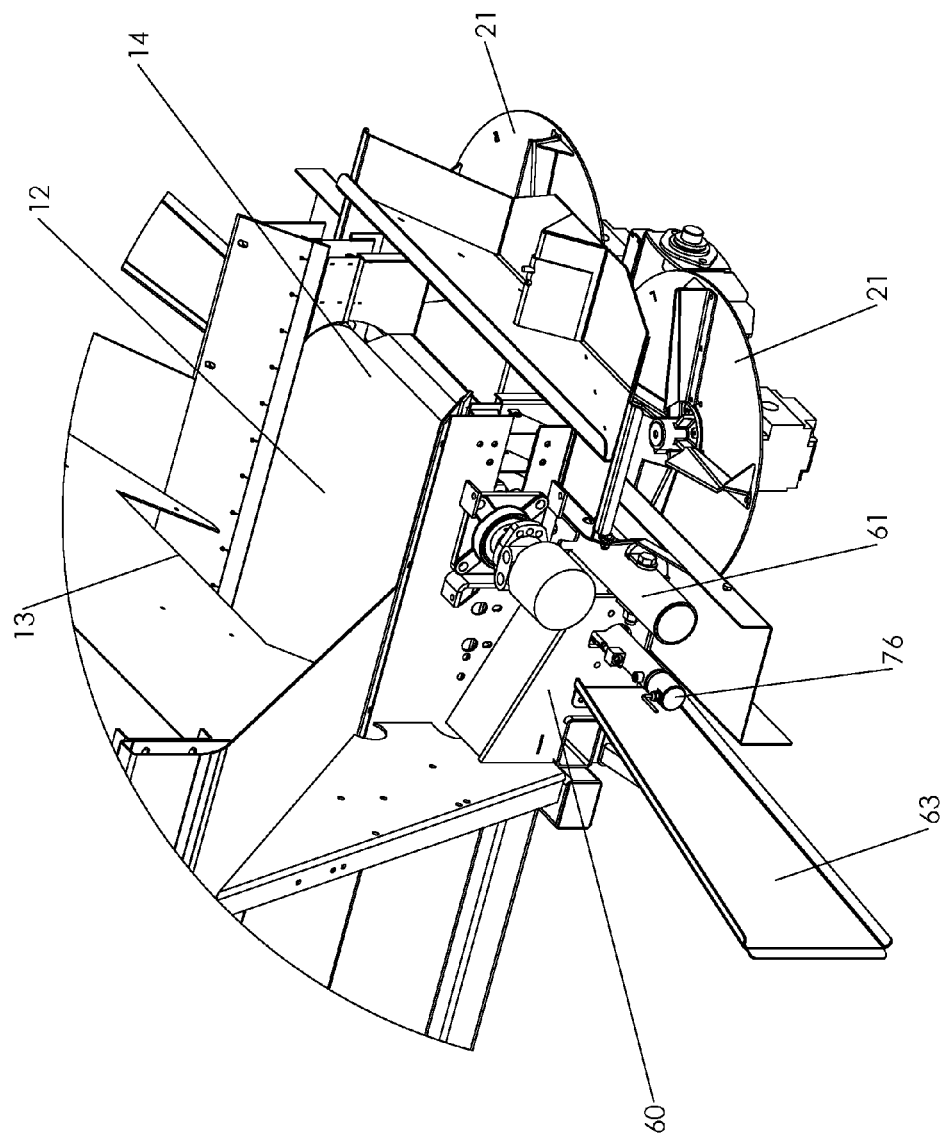
FIG. 13 is a perspective view of present invention.
Figure 14:
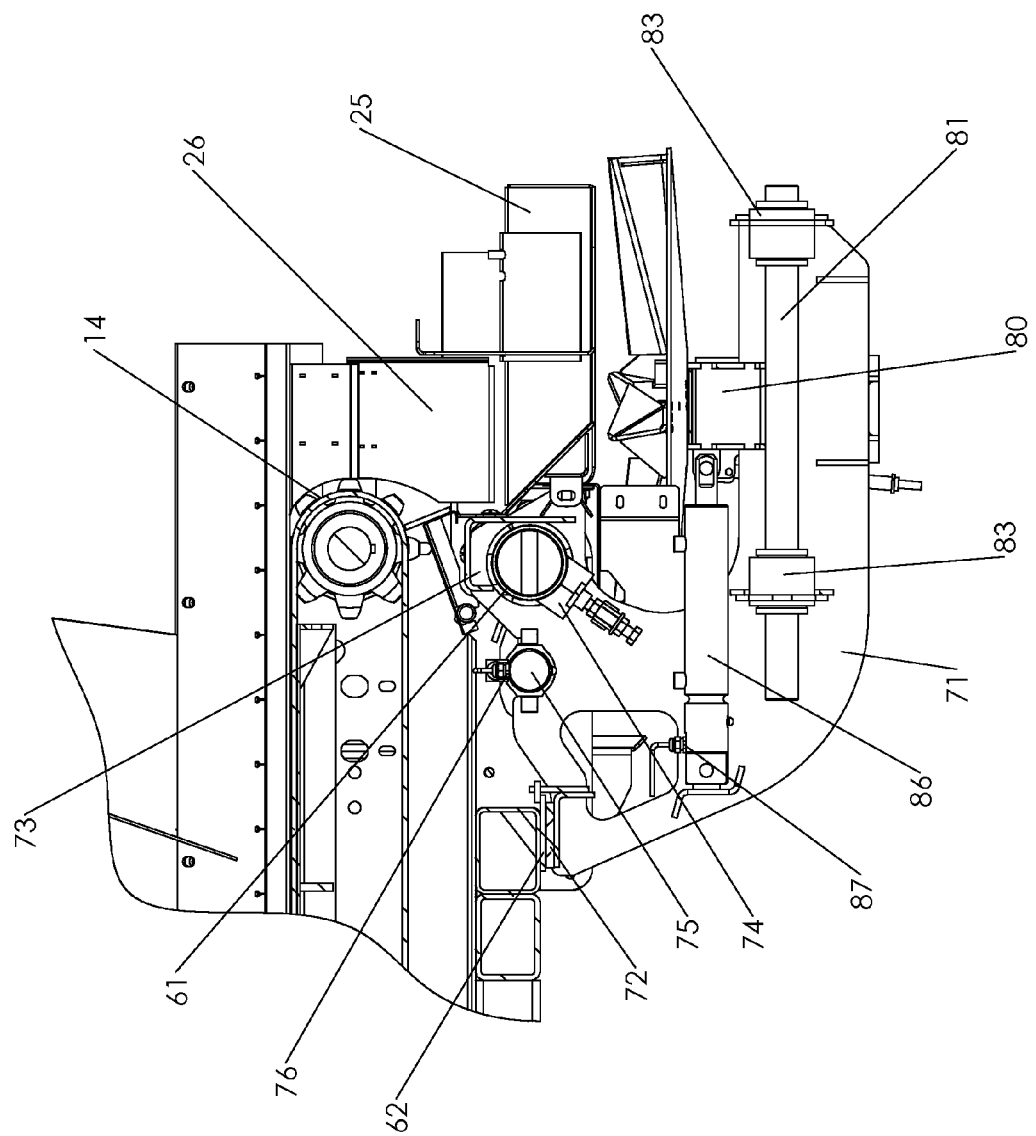
FIG. 14 is a longitudinal vertical cross section of the present invention with details of supporting and actuating means.
Figure 15:
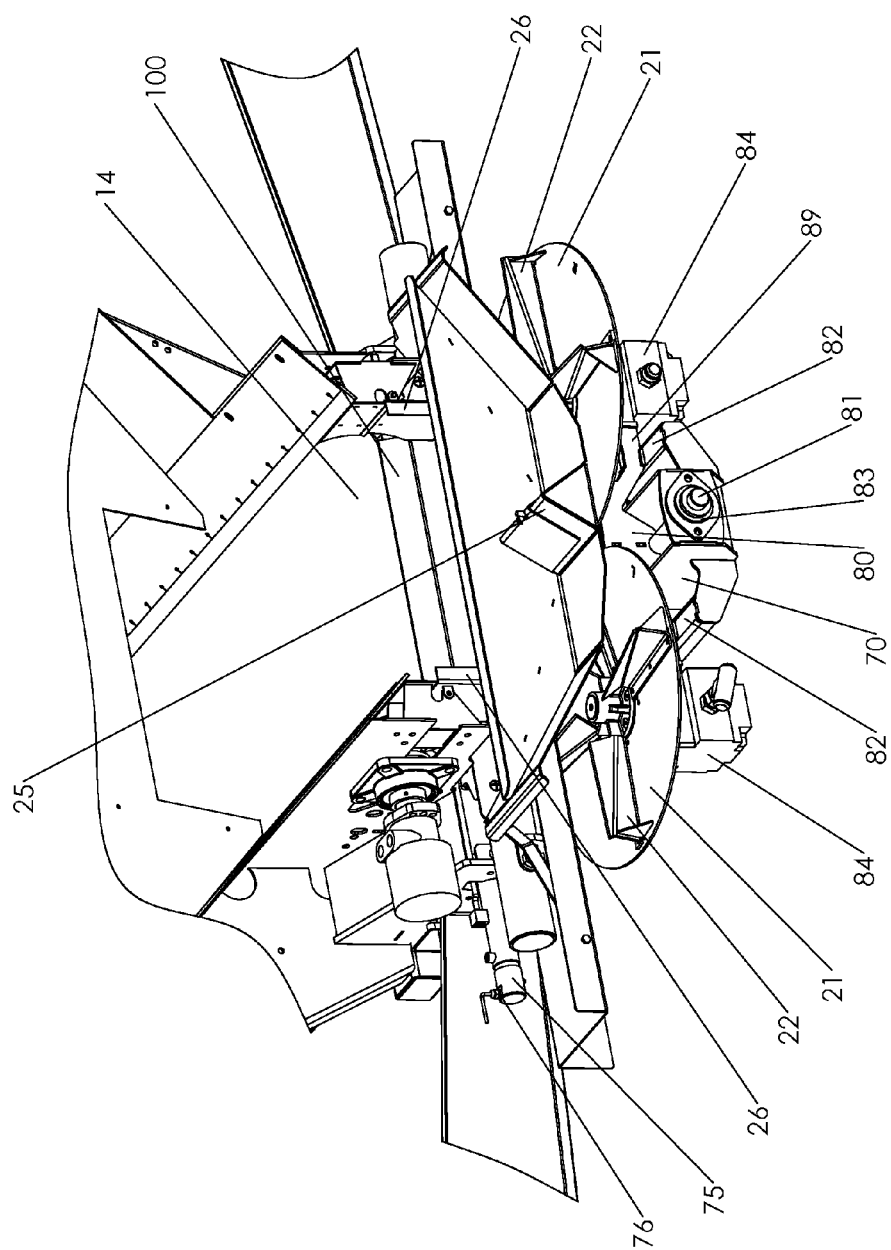
FIG. 15 is a perspective view of present invention.
Figure 16:
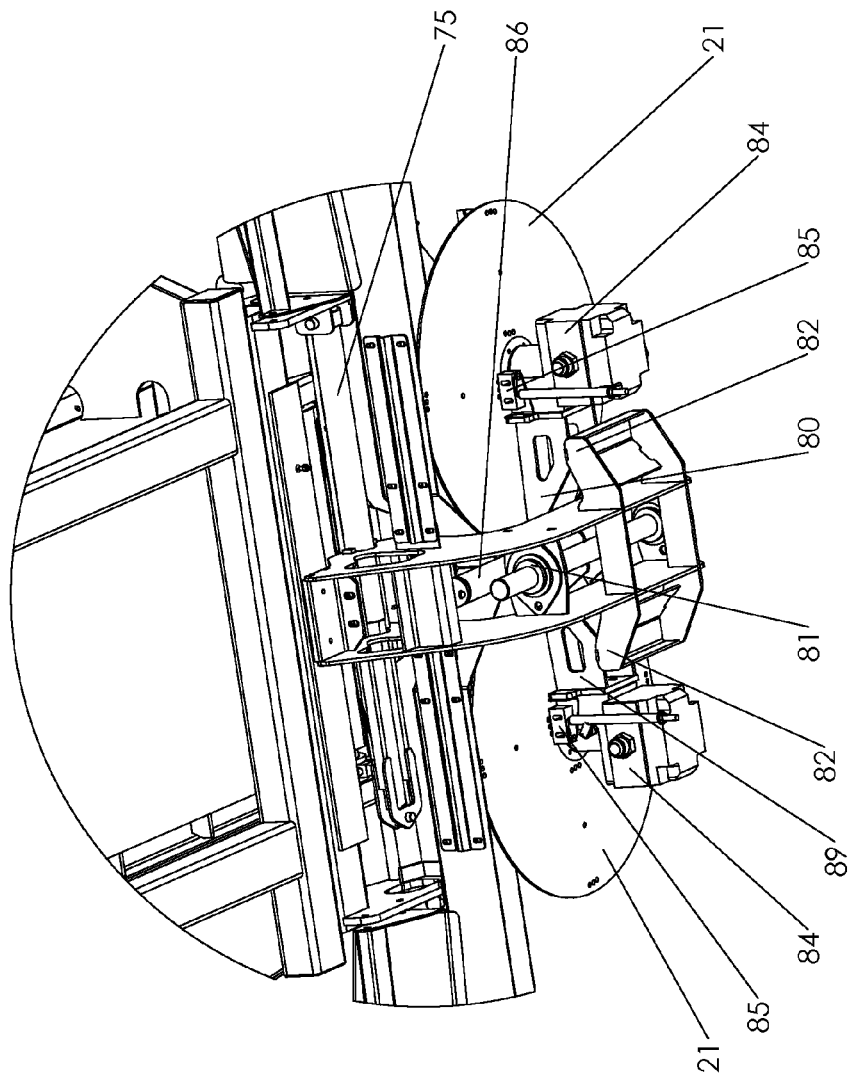
FIG. 16 is a perspective view of underside of present invention noting details of longitudinal movable frame.

In FIG. 12, the spinner spreader 20 contains subcomponents of the main spinner supporting frame generally denoted 60, a transversely movable spinner frame generally denoted 70, a longitudinally movable spinner frame generally denoted 80, a means to move the transversely movable spinner frame 70 side to side and a means to move the longitudinally movable spinner 80 frame fore and aft.

Referring to FIGS. 13 thru 16, the main spinner supporting frame 60 is attached fixedly to the spreader 10 and is stationary with respect to the conveyor discharge end 14 or any plurality of conveying or metering means. The main spinner supporting frame 60 has one or more guiding 61 and supporting means 62 for the transversely movable spinner frame 70. Attached to the main spinner supporting frame 60 are material deflectors 63 to keep particulate material from being cast forward from rotating spinner disks 21 into the spreader supporting chassis.

The transversely movable spinner frame generally denoted 70 comprises a frame 71, one or more guiding 72, supporting 73, and captivating means 74 that interact with the guiding 61 and supporting means 62 of the main spinner frame 60 and a material divider 25 that is fixed to the transversely movable spinner frame 70. The transversely movable spinner frame 70 in turn supports the longitudinally movable spinner frame generally denoted 80 via one or more guiding 81 and supporting means 82.

The longitudinally movable spinner frame generally denoted 80 comprises a frame 89 that is supported by the transversely movable spinner frame 70, one or more guiding 81, supporting 82, and captivating 83 means that interact with the guiding 72 and supporting 73 means of the transversely movable spinner frame 70. Mounted to each side of the longitudinally movable spinner frame are spinner motors 84. The spinner motors 84 rotate the spinner disks 21 and the attached spinner blades 22. Material falling from conveyor discharge end 14 passes through the material divider 25, onto the disks 21, and are broadcast from the blades 22. The longitudinally movable spinner frame 80 also supports spinner disk speed sensors 85 capable of monitoring the disk rotational speed.

Mounted between the main frame 60 and transversely movable frame 70 is a linear actuator 75 that is sufficient in size to shift the transversely movable frame 70 from side to side along the guiding means 72 and supporting means 73 so as to divide the material flow from the conveyor discharge end 14 into infinitely variable ratios between 0:100 and 100:0 whereas the position for a symmetrical spread pattern, generally seen in FIG. 4, divides the material to a 50:50 ratio. In the preferred embodiment, the linear actuator 75 is a hydraulic cylinder with an internal magnetoresistive sensor 76 capable of providing position feedback to a control system generally shown in FIG. 20. Whereas anyone skilled in the art of actuators will also understand that the hydraulic cylinder linear actuator 75 and sensor 76 could be replaced with any number of actuating devices and sensors that take a like form, such as an electric actuator or pneumatic cylinder with a potentiometer or LVT sensor.

Mounted between the transversely movable frame 70 and the longitudinally movable frame 80 is a linear actuator 86 that is sufficient in size to shift the longitudinally movable frame 80 fore and aft along the guiding 81 and supporting 82 means so as to place the material flow from the conveyor discharge end 14 and passing through the material divider 25 onto the spinner disk 21 as described in the Rissi '281 patent. In the preferred embodiment, the linear actuator 86 is a hydraulic cylinder with an internal magnetoresistive sensor 87 capable of providing position feedback to a control system generally shown in FIG. 20. Whereas anyone skilled in the art of actuators will also understand that the hydraulic cylinder linear actuator 86 and sensor 87 could be replaced with any number of actuating devices and sensors that take a like form, such as an electric actuator or pneumatic cylinder with a potentiometer or LVT sensor.

Figure 17:
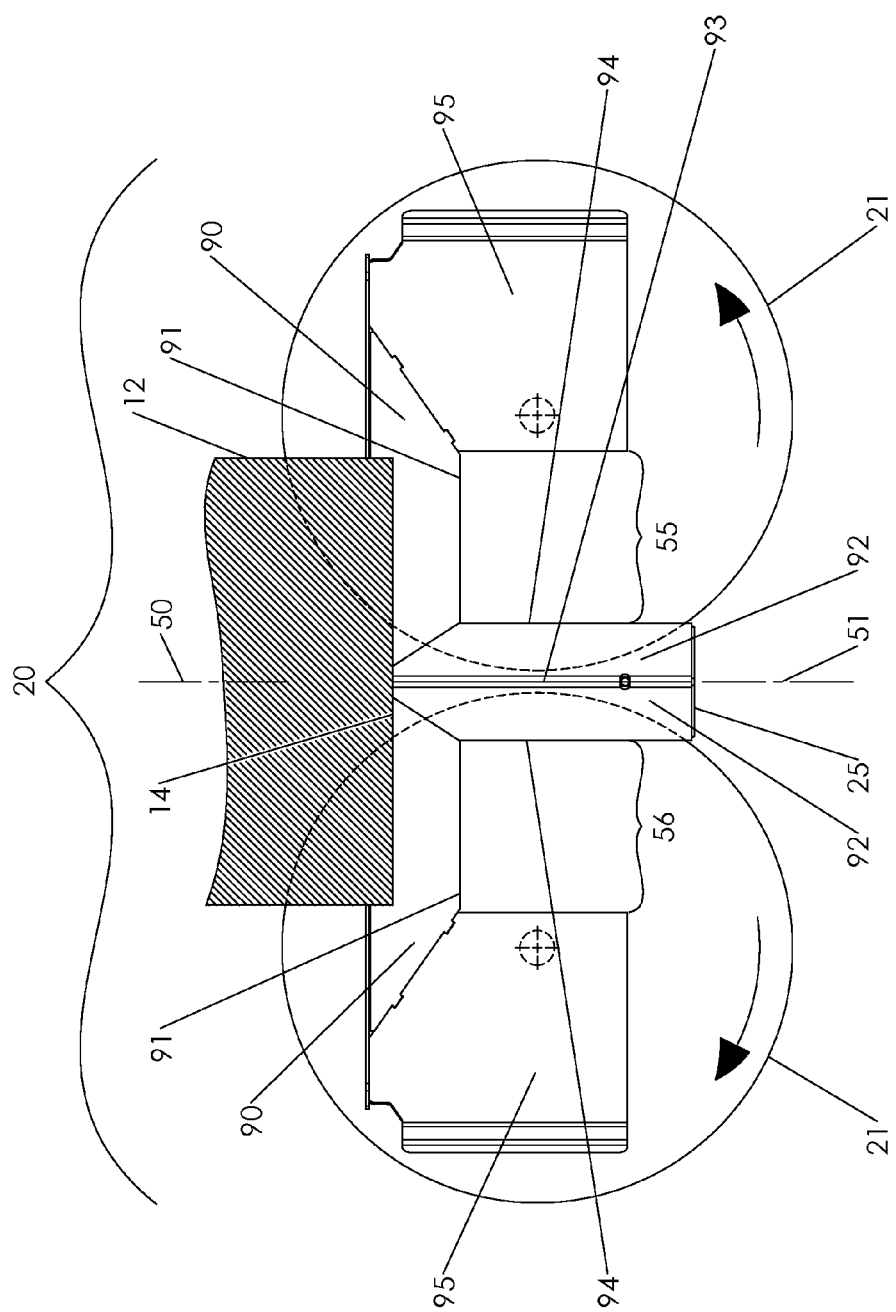
FIG. 17 is a simplified top view of spinner with details of divider, conveyor and spinner disk relationships.
Figure 18:
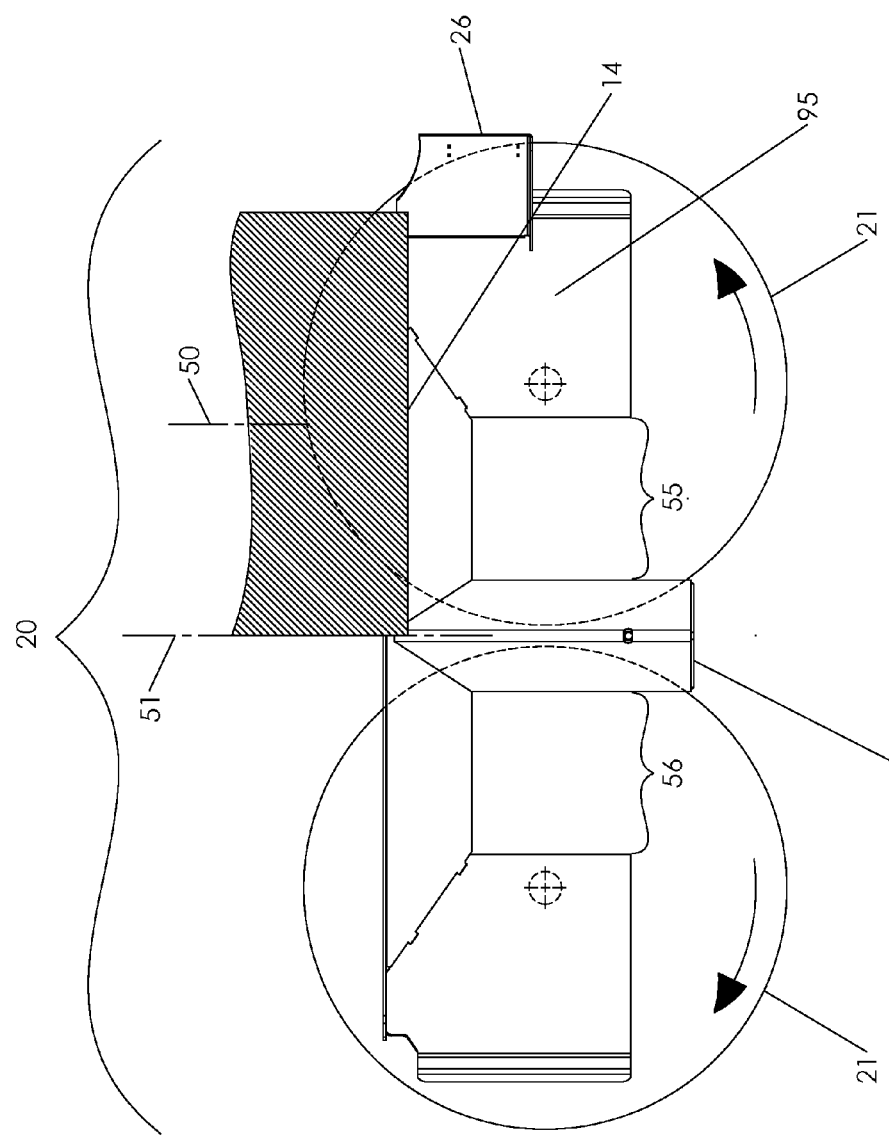
FIG. 18 is a simplified top view of spinner with details of divider, conveyor and spinner disk with spinner shifted.
Figure 19:
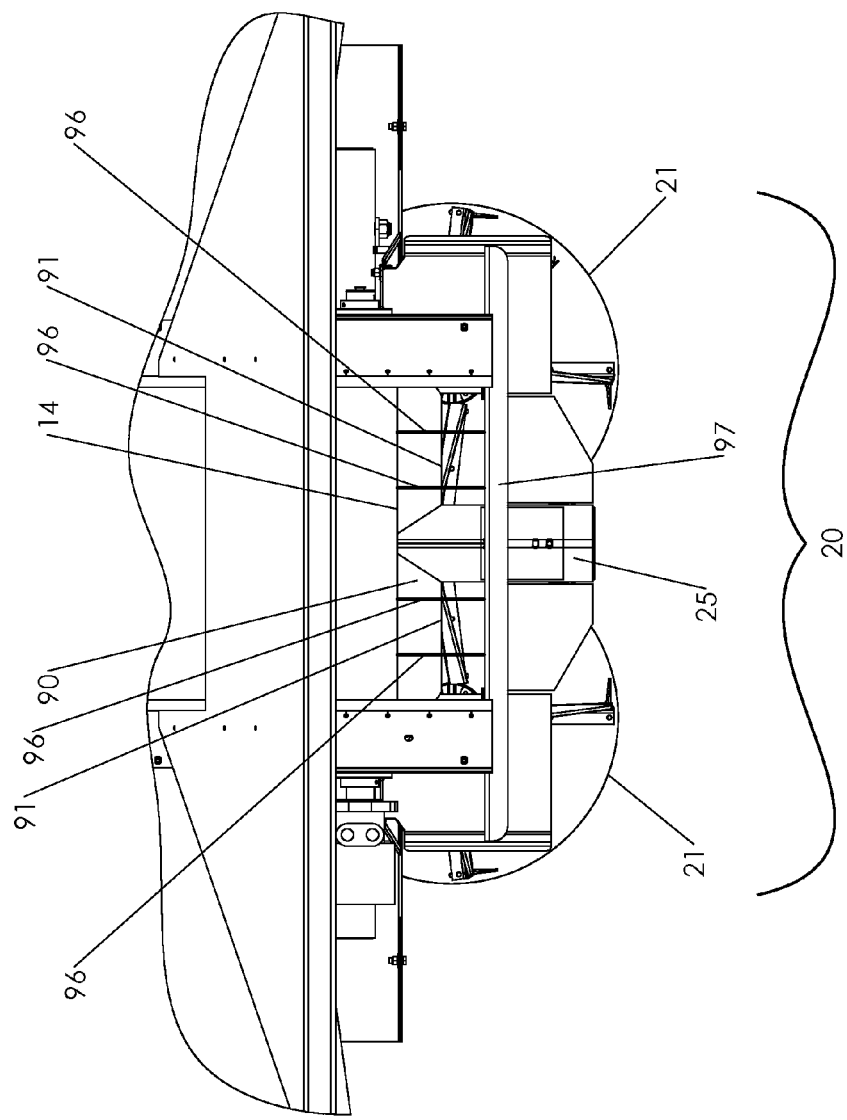
FIG. 19 is a top view of spinner with details of vertical dividers.

FIGS. 17-19 are overhead views of spinner 20, of the present invention with details of other features related to aiding position and directing the flow of material falling from the conveyor discharge end. One should note that the material divider 25 forms two symmetrical openings, the right hand material divider opening 55 and left hand material divider opening 56, that funnel material to the spinner disks 21 below. Each divider opening is defined by three walls. The first wall 90 is a forward sloped surface that funnels material and defines the leading drop edge 91. The second wall 92 is an inside sloped surface that rises to meet the inside surface of the adjacent divider opening and defines both the dividing edge 93 of the material stream and the outer drop edge 94 with respect to the spinner disk 21. The third wall 95 is the outside surface that extends upward and away from the spinner centerline 51. This outside surface 95 extends well beyond the outer edges of the conveyor 14, and any metering cylinders of a multi-compartment spreader, when the transversely movable frame 70 is centered with the conveyor 12.

As the transversely movable frame 70 is shifted to divide all material to one of the openings designated 55 and 56, this extended outside surface 95 interacts with the hinged deflector 26 to funnel the material through the opening and, to the most part, towards the center of the spinner disk 21.

Also aiding positioning and directing the flow of material falling from the conveyor discharge end 14 are one or more generally vertical segmenting vanes 96 that keep the falling material divided into channels during free fall from the conveyor discharge end 14 to the material divider 25. To further aid positioning and directing the flow of material falling from the conveyor end 14 is a material divider backplate 97 that keeps the column of falling material from deviating more than a set distance from the leading drop edge 91 of the forward sloped surface 90. This backplate 97 is removable to facilitate large flows exceeding the opening areas defined by the three walls 90, 92, and 95 and backplate 97.

Across the upper edge of the first wall that is the forward sloped surface 90 is a pliable material that forms a seal 100 between the bottom of the discharge conveyor end 14 and the top of the material divider 25 to further keep falling material within the defined area of the three walls.

In this preferred embodiment, the drop edge 91 of the forward sloped surface 90 is straight and perpendicular to the conveyor centerline 50. It should also be understood that the shape of this drop edge 91 and the angle to the conveyor centerline 50 can be modified to further shape the distribution and pattern of the broadcast material. Likewise the distance between the spinner disks 21 and the width of the inverted vee formed by the second wall that is the inside sloped surface 92 of the material divider 25 can be modified to further shape the distribution and pattern of the broadcast material.

U.S. Pat. No. 6,517,281 has enjoyed considerable success in the industry. The systems and methods of that patent have been manufactured and automated. The systems and methods of the present invention can be readily automated with hardware similar to those systems which currently automate the 281 patent. Of course it would be necessary to include a transversely movable frame; an actuator; a sensor or an actuator/sensor as well as software changes to result in moving the transversely movable frame and longitudinally movable frame to produce variations in spread patterns as discussed above. It is believed that those skilled in the art of automating the 281 patent could readily adapt such systems to carry out the innovative aspects of the present invention. The following discussion is provided as a summary of some of the control requirements that may exist or components or features which could be contemplated when automating the present invention.

Figure 20:
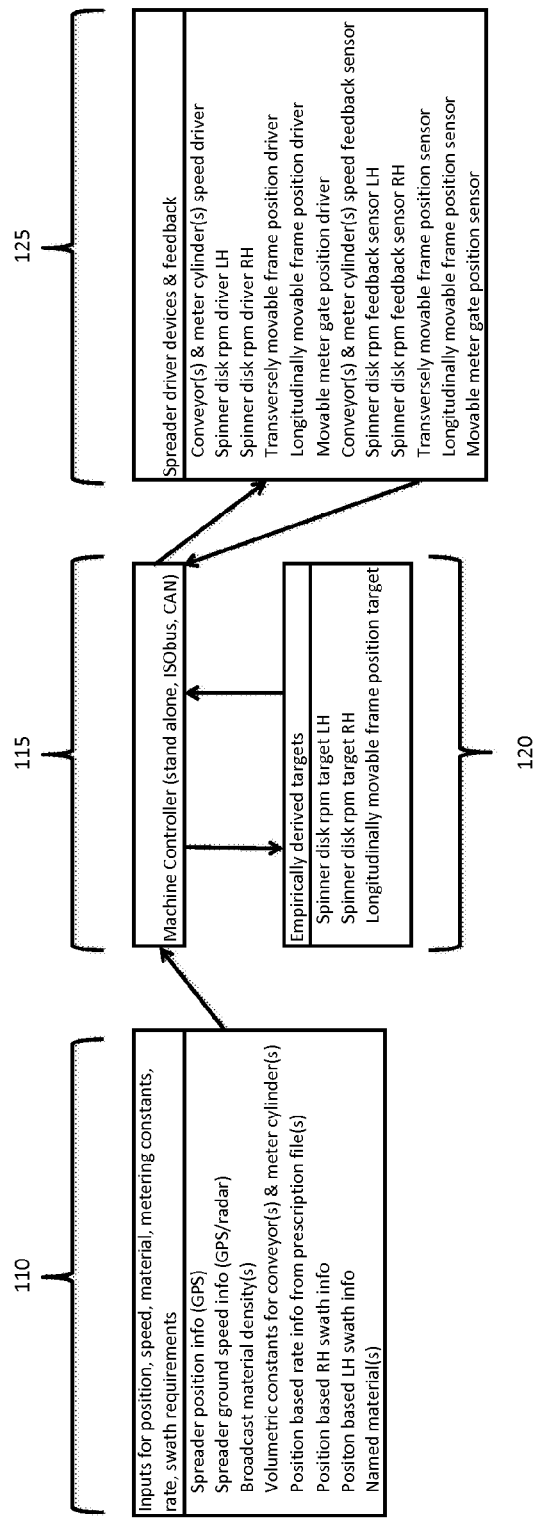
FIG. 20 is a diagrammatic overview of a control system for the present invention.
Figure 22:
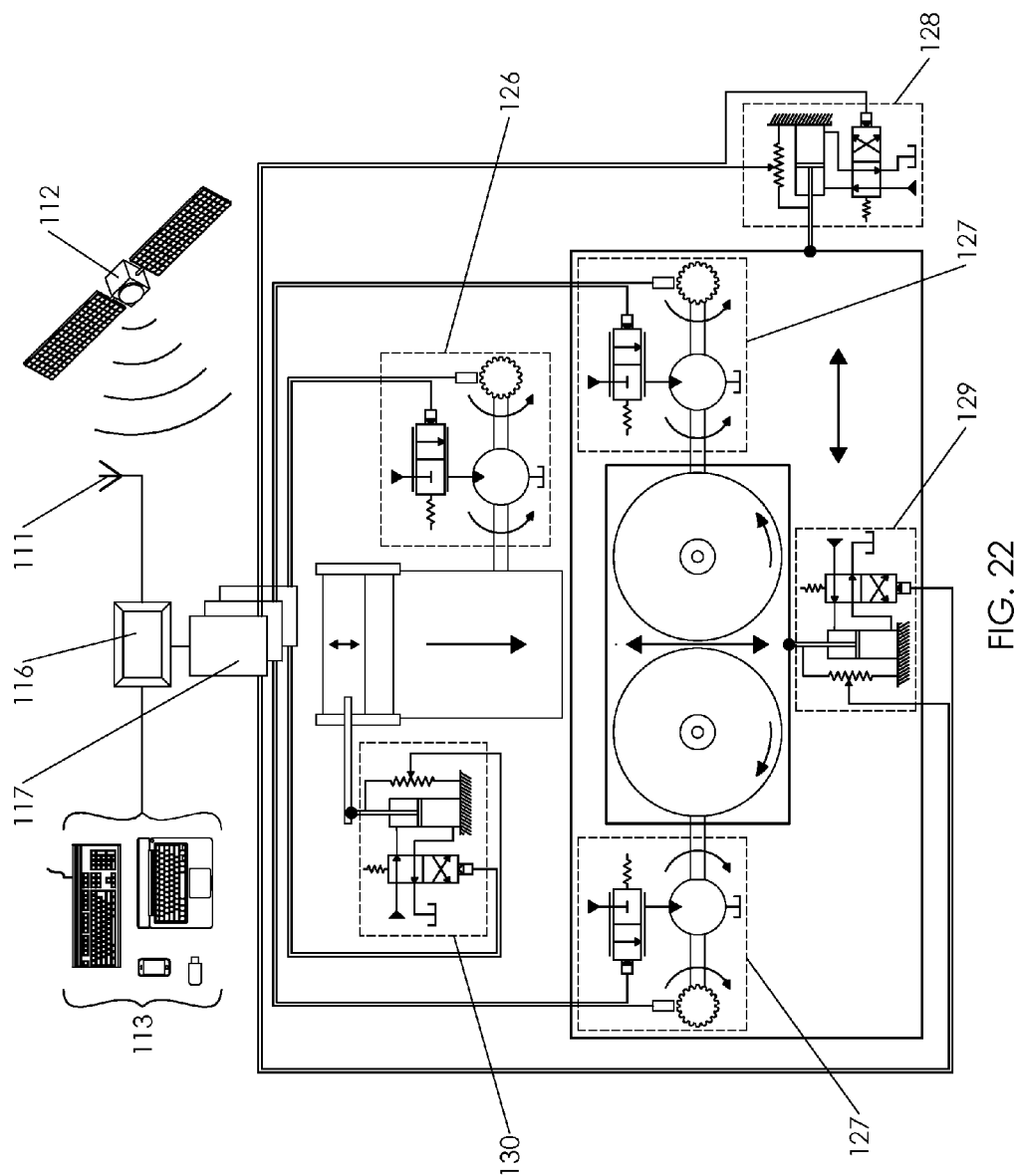
FIG. 22 is a depiction of a system of the present invention in its intended environment.

Now referring to FIGS. 20 and 22, there are shown simplified diagrammatic overviews of control system elements for the present invention. The machine controller element generally designated 115 comprising electronics, software, and user interfaces. The machine controller element 115 can take many different physical forms from a single, stand alone box including all electronics, software and a user interface, to a user interface 116 and a plurality of boxes 117 at different locations and with different functions. A machine controller element 115 with a plurality of boxes 117 and a user interface 116 are typically connected via ISO Bus or CAN Bus networks. This machine controller element 115 processes information and initiates machine actions based on external input elements generally designated 110, empirically derived target elements generally designated 120, and feedback from spreader device elements generally designated 125.

The external input elements 110 comprises inputs that define spreader position and speed through a Global Positioning System (GPS) pictorially shown as a GPS satellite 112 and a GPS receiver 111. In combination with speed and position information, the external input elements 110 also include variable symmetrical or asymmetrical swath width definitions, variable rate nutrient prescription files, nutrient material densities, and conveyor metering volumetric constants inputs that are used by the machine controller element 115 to meter the correct volume of material for variable rates and swath widths. Material ID or named material inputs are used for association with, and editing of, the empirically derived target elements 120 as it is understood from previous descriptions materials have unique size, shape, density, and hardness that affect spread characteristics. These external input elements 110 may be entered into the machine controller element 115 via the user interface 116 or any number of devices, wireless or wired to the controller element, such as laptop computers, keyboards, phones, flash drives, memory cards, etc. that are generally shown 113.

Empirically derived target elements 120 include information needed to control symmetrical or asymmetrical variable swath widths for named materials broadcast at variable rates. The type of information contained in the empirically derived target elements 120 includes the spinner disk rpm for desired widths of a named material as well as movable frame positions needed for desired broadcast pattern symmetry. Empirically derived elements 120 are determined by field tests common to prior art spreaders.

The spreader device elements 125 include drivers and feedback for conveyor speed 126, independent spinner rpm 127, transversely movable frame position 128, longitudinally moveable frame position 129, and movable metering gate 130 per the needs of the external driver elements 110 and empirically derived target elements 120.

It is understood that all elements of FIG. 20 can be applied to single or multi-compartment spreaders. Those skilled in the art of designing automated broadcast spreader systems may create a system which is different from those shown here however it is believed that various modifications and changes to the systems described could be made without deviating from the spirit and scope of the present invention. The appended claims are intended to cover such modifications and changes.

We claim:

1. A spreader for distributing matter comprising:
a first frame; having a frame centerline which is aligned with a vehicle centerline of travel;
a container, at least indirectly, coupled to the first frame and the container having a discharge location;
a main spinner supporting frame fixed with respect to the discharge location;
a transversely movable spinner frame cooperating with and being supported by said main spinner supporting frame, such that said transversely movable spinner frame is configured to translate only in a direction orthogonal with respect to said frame centerline;
a material divider that is mounted to and translates with the transversely movable spinner frame;
said material divider being disposed below said discharge opening and having an open top side which is configured to receive material therein, which material, has passed through said discharge location:
said material divider having a lower portion with a first material opening and a separate and distinct second material opening;
a first disk, disposed below said first material opening of said material divider;
a second disk, disposed below said second material opening of said material divider, wherein the first and second disks are mounted on the transversely movable spinner frame; and
said material divider being sized, configured and located with respect to said first disk and said second disk, so that, material being discharged from said discharge location that moves past the open top side may be funneled in, at least one of:
a first flow past said first material opening and in a direction toward said first disk, and
a second flow past said second material opening and in a direction toward said second disk.

2. The spreader of claim 1 further comprising:
a longitudinally movable spinner frame supported and guided by said transversely movable spinner frame; said longitudinally movable spinner frame being configured to translate in a direction aligned with said frame centerline;
a spinner motor coupled to and supported by the longitudinally movable spinner frame.

3. The spreader of claim 2 wherein said material divider further comprises a material divider backplate which defines a limit of said first material opening.

4. The spreader of claim 3 wherein said material divider backplate is a removable material backplate so as to accommodate a high flow rate of material.

5. The spreader of claim 4 wherein said first material opening and said second material opening are symmetrical with respect to each other.

6. The spreader of claim 2 wherein said transversely movable spinner frame comprises a frame member substantially disposed below said main spinner supporting frame.

7. The spreader of claim 2 wherein said longitudinally movable spinner frame is substantially disposed above a supporting portion of said transversely movable spinner frame.

8. The spreader of claim 1 wherein said material divider is fixed, in at least one direction, with respect to said transversely movable spinner frame.

9. The spreader of claim 8 wherein said material divider is longitudinally fixed with respect to said transversely movable spinner frame.

10. The spreader of claim 1 wherein said transversely movable spinner frame is incrementally transversely adjustable and said first frame is coupled to a vehicle.

* * * * *